(12) United States Patent
Shen et al.

(10) Patent No.: US 9,738,114 B2
(45) Date of Patent: Aug. 22, 2017

(54) WRITING DEVICE WITH INPUT UNIT

(71) Applicant: ASIA VITAL COMPONENTS CO., LTD., Sinjhuang District, New Taipei (TW)

(72) Inventors: Ching-Hang Shen, New Taipei (TW); Fu-Kuei Chang, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 594 days.

(21) Appl. No.: 13/906,292

(22) Filed: May 30, 2013

(65) Prior Publication Data

US 2014/0356044 A1 Dec. 4, 2014

(51) Int. Cl.
*B43K 29/00* (2006.01)
*B43K 29/08* (2006.01)
*B43K 29/10* (2006.01)
*G06F 3/02* (2006.01)

(52) U.S. Cl.
CPC ............ *B43K 29/00* (2013.01); *B43K 29/004* (2013.01); *B43K 29/08* (2013.01); *B43K 29/10* (2013.01); *G06F 3/0221* (2013.01)

(58) Field of Classification Search
CPC ........ G06F 3/0221; B43K 29/00; B43K 29/08
USPC .......................................... 401/195; 708/138
See application file for complete search history.

(56) References Cited

U.S. PATENT DOCUMENTS

| 5,220,521 | A | * | 6/1993 | Kikinis | G06F 3/0221 |
| | | | | | 361/679.1 |
| 5,616,897 | A | * | 4/1997 | Weber | G06F 3/0221 |
| | | | | | 200/5 A |
| 6,044,152 | A | * | 3/2000 | Mendolia | H01H 13/702 |
| | | | | | 379/368 |
| 6,655,863 | B2 | * | 12/2003 | Lin | 400/491 |
| 6,867,712 | B2 | * | 3/2005 | Tai | H01H 13/86 |
| | | | | | 341/22 |
| 8,511,920 | B2 | * | 8/2013 | Wu | G06F 3/041 |
| | | | | | 341/22 |
| 2003/0025668 | A1 | | 2/2003 | Lin et al. | |
| 2009/0250267 | A1 | * | 10/2009 | Heubel et al. | 178/18.03 |
| 2009/0250328 | A1 | * | 10/2009 | Tseng | G06F 3/0221 |
| | | | | | 200/5 A |

(Continued)

FOREIGN PATENT DOCUMENTS

| CN | 101561722 B | 2/2011 |
| CN | 202661977 U | 1/2013 |

(Continued)

*Primary Examiner* — Jennifer C Chiang
*Assistant Examiner* — Bradley Oliver
(74) *Attorney, Agent, or Firm* — C. G. Mersereau; Nikolai & Mersereau, P.A.

(57) ABSTRACT

A writing device with input unit includes a case and an input unit receiving in the case. The input unit includes a flexible main body, a sensing electrode layer and a protection layer. The flexible main body has a first face and a second face. The sensing electrode layer has a first sensing electrode and a second sensing electrode disposed on the second face of the flexible main body. The protection layer is correspondingly disposed on the second face of the flexible main body to cover the sensing electrode layer. The writing device with input unit has small volume and is lightweight so that a user can conveniently carry, store and use the writing device with input unit.

9 Claims, 14 Drawing Sheets

(56) References Cited

U.S. PATENT DOCUMENTS

| | | | |
|---|---|---|---|
| 2010/0127992 A1* | 5/2010 | Schmid | G06F 3/045 345/173 |
| 2010/0188339 A1* | 7/2010 | Yeh et al. | 345/170 |
| 2011/0304562 A1* | 12/2011 | Wu | G06F 3/0221 345/173 |
| 2012/0019401 A1* | 1/2012 | Wu | G06F 3/0221 341/22 |
| 2013/0000952 A1* | 1/2013 | Srinivas et al. | 174/126.1 |
| 2013/0037400 A1* | 2/2013 | Chen | G06F 3/0221 200/5 A |
| 2013/0215035 A1* | 8/2013 | Guard | 345/168 |
| 2014/0160025 A1* | 6/2014 | Natarajan | 345/168 |
| 2015/0206673 A1* | 7/2015 | Lin | G06F 3/0202 200/5 A |
| 2015/0261264 A1* | 9/2015 | Brown | G06F 3/0221 345/174 |

FOREIGN PATENT DOCUMENTS

| | | |
|---|---|---|
| TW | I358654 B | 2/2012 |
| TW | M429931 U | 5/2012 |
| TW | M460331 U | 8/2013 |

\* cited by examiner

WRITING DEVICE WITH INPUT UNIT

BACKGROUND OF THE INVENTION

1. Field of the Invention

The present invention relates to a writing device with input unit, which is convenient to carry and use.

2. Description of the Related Art

In recent years, following the development of touch panel technique, various portable electronic devices with display function, such as intelligent cellular phones, tablets and MP5, have employed touch panels instead of the conventional mechanical keys that occupy much room.

There is a trend that tablets, intelligent cellular phones and portable electronic devices or televisions are designed with handwriting and touch input functions. A user can conveniently use his/her finger or a stylus to touch and operate an electronic device. However, the intelligent cellular phone or the tablet or the portable electronic device has a relatively small screen. It is inconvenient to input data by means of handwriting. Therefore, some manufacturers have reverted to develop the earlier portable mini-keyboard and/or slim keyboard with mechanical keys. The mini-keyboard and/or slim keyboard is wiredly connected to the intelligent cellular phone, the tablet or the portable electronic device via USB or wirelessly connected to the intelligent cellular phone, the tablet or the portable electronic device via a Bluetooth device for use. This can achieve the object of convenient input. However, the mini-keyboard and/or slim keyboard still occupy a considerable space and are inconvenient to carry.

Some manufacturers have developed knockdown and foldable keyboards. However, such keyboards are like the mini-keyboard and inconvenient for a user to carry.

SUMMARY OF THE INVENTION

It is therefore a primary object of the present invention to provide a writing device with input unit, which has multiple functions and is convenient to carry.

To achieve the above and other objects, the writing device with input unit of the present invention includes a case, a winding unit and an input unit. The case has a receiving chamber and an opening. The winding unit is disposed in the receiving chamber. The input unit is wound on the winding unit with one end connected with the winding unit. The winding unit with the input unit wound thereon is received in the receiving chamber. The other end of the input unit slightly protrudes from the opening or is flush with the opening. The input unit includes a flexible main body, a sensing electrode layer and a protection layer. The flexible main body has a first face and a second face. The sensing electrode layer has a first sensing electrode and a second sensing electrode. The first and second sensing electrodes are arranged in alignment with each other without contacting each other. The sensing electrode layer is disposed on the second face of the flexible main body. The protection layer is correspondingly disposed on the second face of the flexible main body to cover the sensing electrode layer.

The writing device with input unit of the present invention is convenient to carry and operate.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
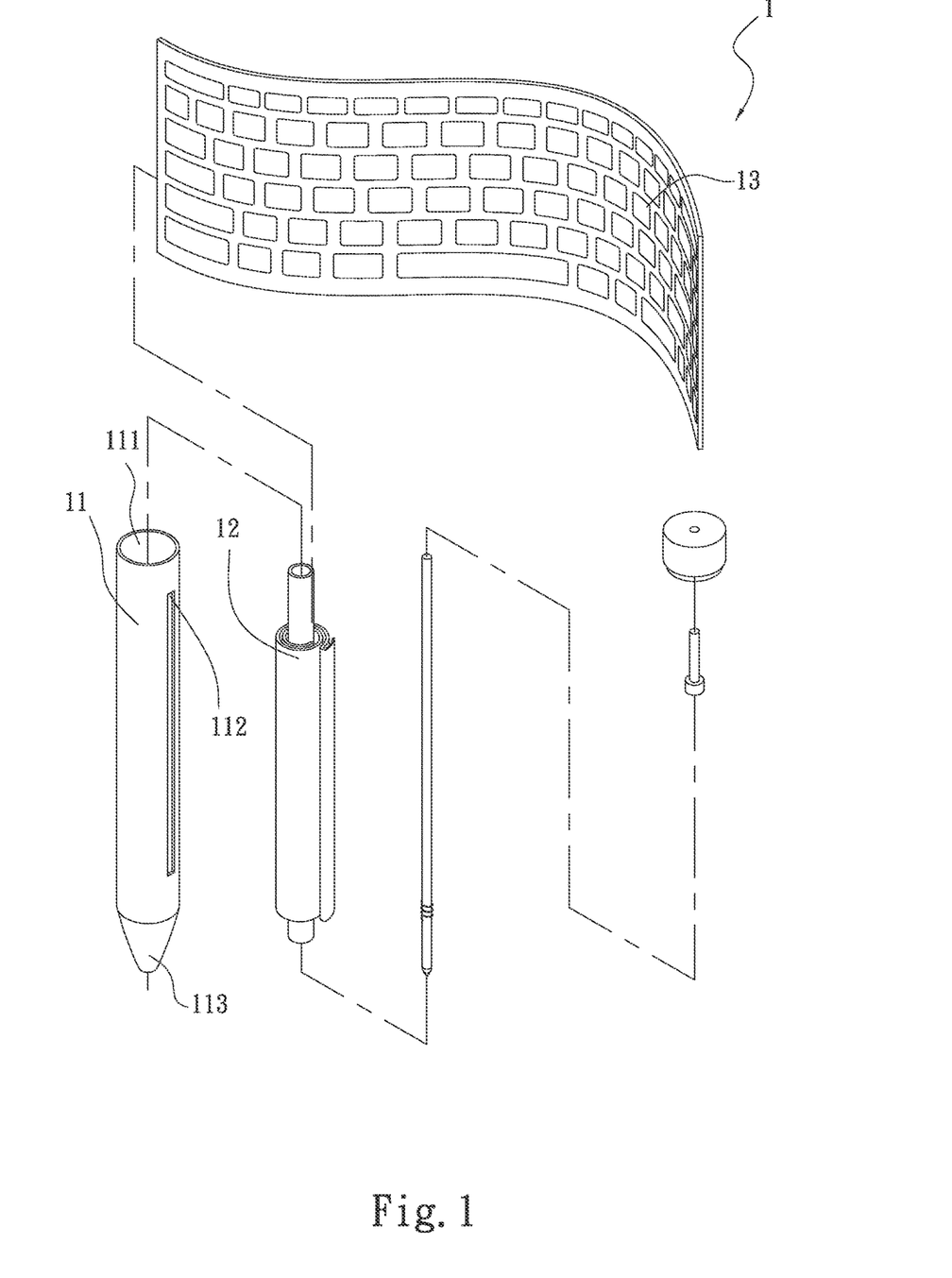
FIG. 1 is a perspective exploded view of a first embodiment of the writing device with input unit of the present invention.
Figure 2:
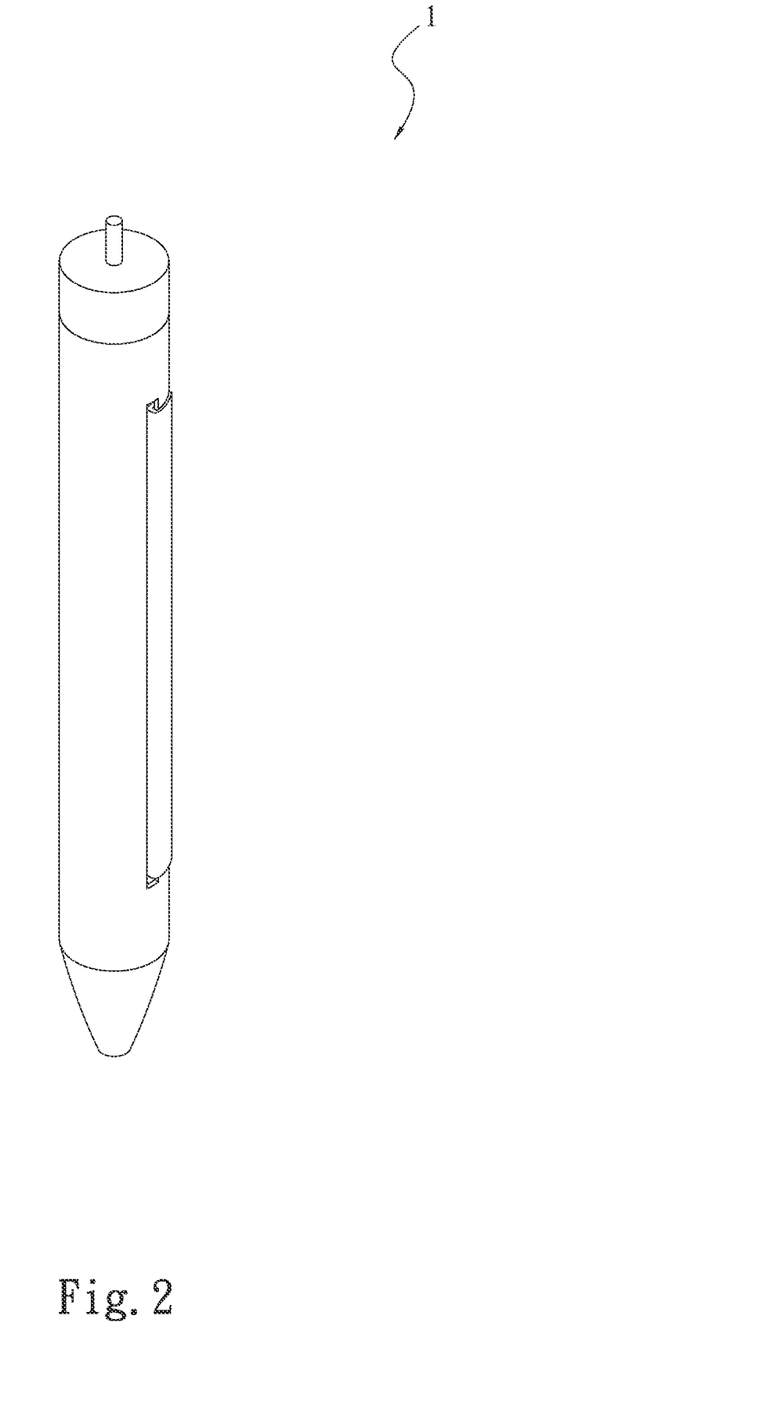
FIG. 2 is a perspective assembled view of the first embodiment of the writing device with input unit of the present invention.
Figure 3:
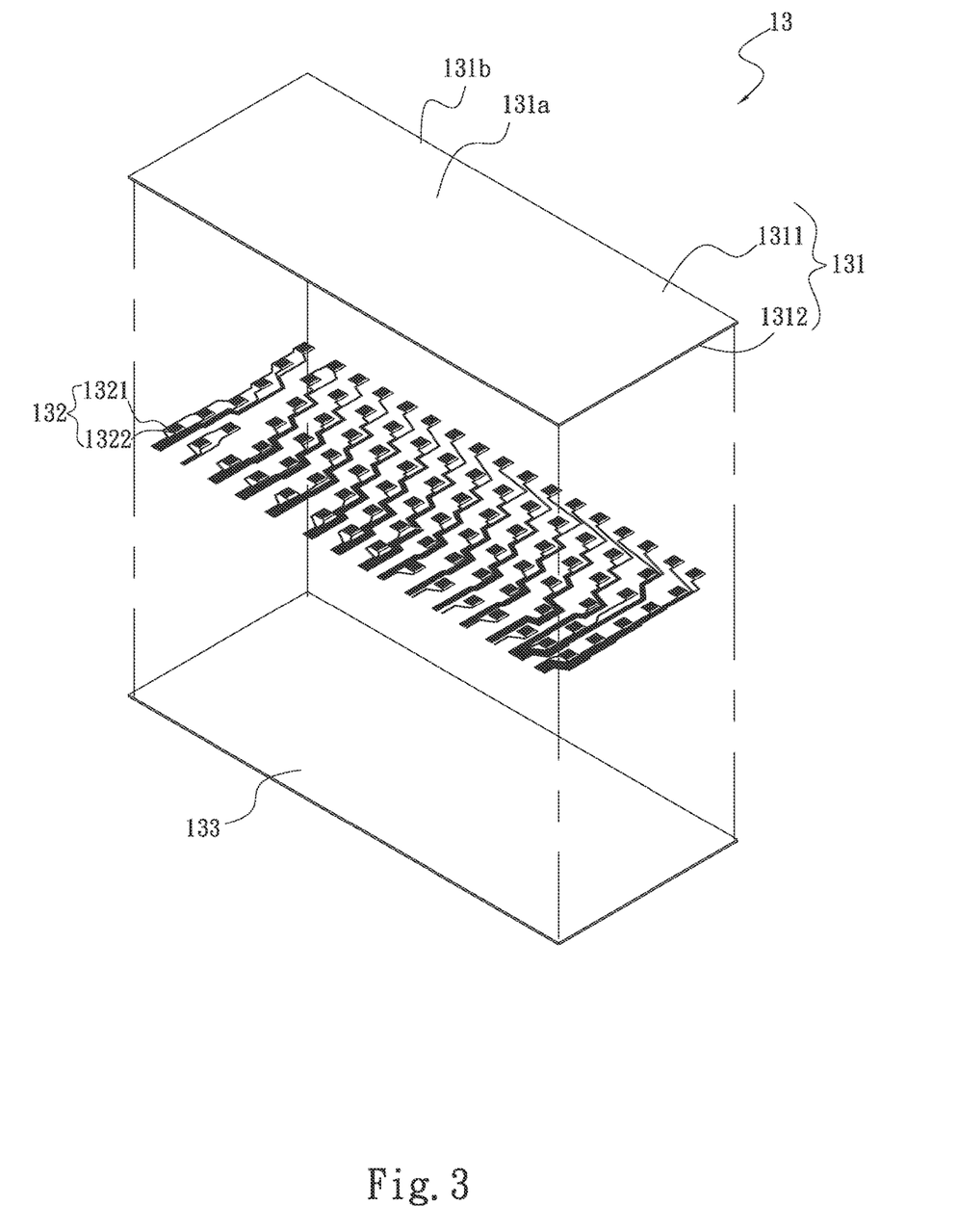
FIG. 3 is a perspective exploded view of the input unit of the first embodiment of the writing device with input unit of the present invention.

Please refer to FIGS. 1, 2 and 3. FIG. 1 is a perspective exploded view of a first embodiment of the writing device with input unit of the present invention. FIG. 2 is a perspective assembled view of the first embodiment of the writing device with input unit of the present invention. FIG. 3 is a perspective exploded view of the input unit of the first embodiment of the present invention. According to the first embodiment, the writing device 1 with input unit of the present invention includes a case 11, a winding unit 12 and an input unit 13. The input unit 13 includes a flexible main body 131, a sensing electrode layer 132 and a protection layer 133.

The case 11 has a receiving chamber 111 and an opening 112. The winding unit 12 is disposed in the receiving chamber 111.

The input unit 13 is wound on the winding unit 12 with one end connected with the winding unit 12. The winding unit 12 with the input unit 13 wound thereon is received in the receiving chamber 111. The other end of the input unit 13 slightly protrudes from the opening 112 or is flush with the opening 112 and exposed to outer side. The flexible main body 131 of the input unit 13 has a first face 1311 and a second face 1312. The sensing electrode layer 132 is selected from a group consisting of transparent ITO, nano silver and metal paste. The sensing electrode layer 132 has a first sensing electrode 1321 and a second sensing electrode 1322. The first and second sensing electrodes 1321, 1322 are arranged in alignment with each other without contacting each other. The sensing electrode layer 132 is disposed on the second face 1312 of the flexible main body 11. The protection layer 133 is correspondingly disposed on the second face 1312 of the flexible main body 131 to cover the sensing electrode layer 132.

The flexible main body 131 is defined with a touch section 131a and a non-touch section 131b arranged around the touch section 131a. The first and second sensing electrodes 1321, 1322 of the sensing electrode layer 132 are disposed in the touch section 131a. The first and second sensing electrodes 1321, 1322 partially extend to the non-touch section 131b.

A writing head 113 is disposed at one end of the case 11. The writing head 113 is selected from a group consisting of a ballpoint pen head, a pencil head and a touch probe. In this embodiment, the writing head 113 is, but not limited to, a touch probe for illustration purposes only.

The input unit 13 is a touch keyboard or a handwriting tablet. In this embodiment, the input unit 13 is, but not limited to, a touch keyboard for illustration purposes only.

In use of the input unit 13, a user can draw out the end of the input unit 13, which end slightly protrudes from the opening 112 or is flush with the opening 112 and exposed to outer side, in a direction away from the opening 112. Then the input unit 13 is fixed on an outer side of the receiving chamber 111 of the case 11 by an external force for the user to operate. After used, the input unit 13 is released from the external force, whereby under the winding force of the winding unit 12, the input unit 13 is rewound onto the winding unit 12 and retracted into the receiving chamber 111 of the case 11.

Figure 4:
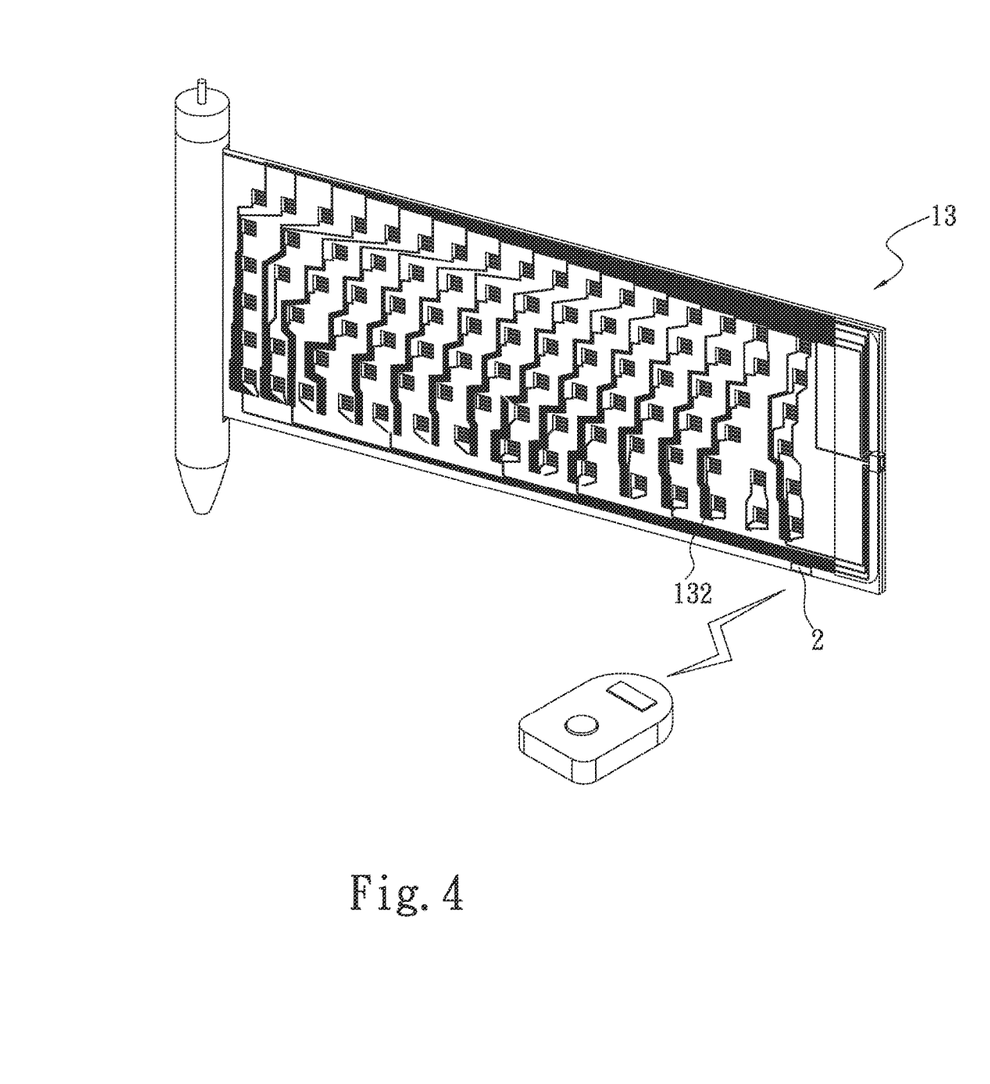
FIG. 4 is a perspective view of the input unit of a second embodiment of the writing device with input unit of the present invention.

Please now refer to FIG. 4, which is a perspective view of the input unit of a second embodiment of the writing device with input unit of the present invention. The second embodiment is partially identical to the first embodiment in structure and thus will not be repeatedly described hereinafter. The second embodiment is different from the first embodiment in that the second embodiment further includes a wireless signal transmission unit 2 electrically connected to the sensing electrode layer 132. The wireless signal transmission unit 2 is selected from a group consisting of an infrared transmitter, a Bluetooth transmitter, an RF signal transmitter and an NCF transmission chip. By means of the wireless signal transmission unit 2, the input unit 13 can be connected to other electronic devices and co-used therewith. Alternatively, by means of the wireless signal transmission unit 2, the input unit 13 can obtain power from the electromagnetic wave in the wireless signal.

Figure 5:
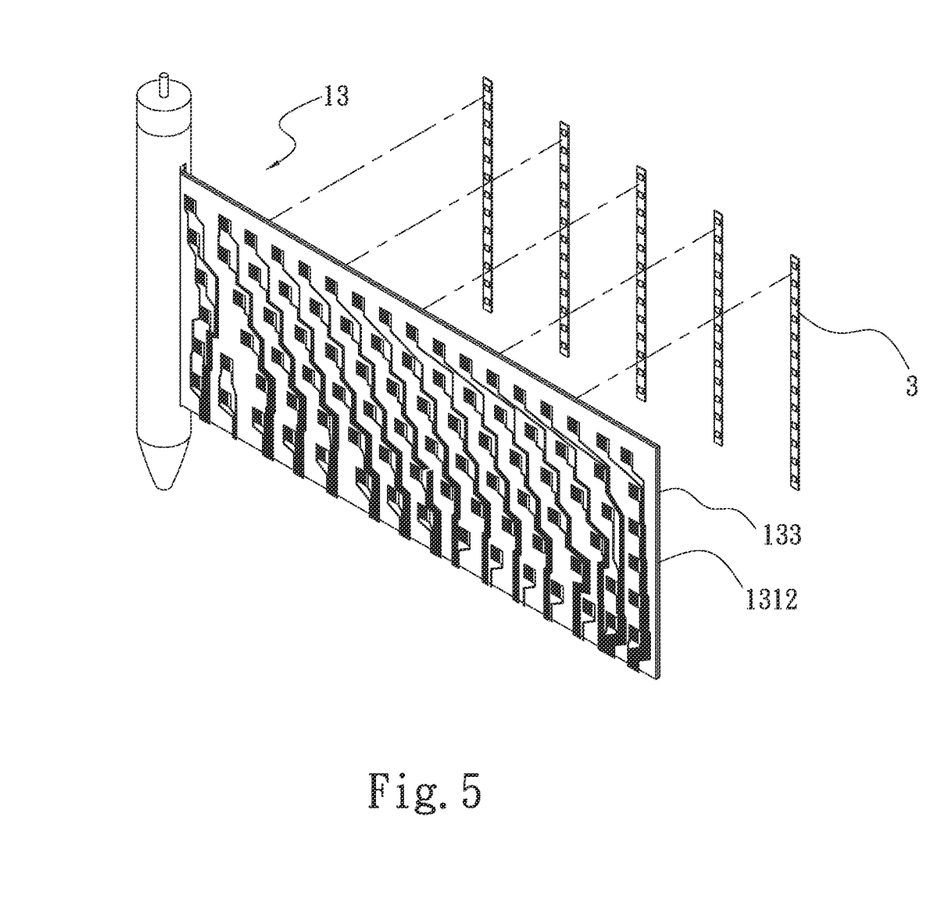
FIG. 5 is a perspective exploded view of a third embodiment of the writing device with input unit of the present invention.

Please now refer to FIG. 5, which is a perspective exploded view of a third embodiment of the writing device with input unit of the present invention. The third embodiment is partially identical to the first embodiment in structure and thus will not be repeatedly described hereinafter. The third embodiment is different from the first embodiment in that the third embodiment further includes a light-emitting unit 3 having multiple LED bulbs. The light-emitting unit 3 is disposed on the other face of the protection layer 133, which face is distal from the second face 1312 of the flexible main body 131. The light-emitting unit 3 serves to project light onto the input unit 13 for illuminating the input unit 13. Alternatively, the light-emitting unit 3 can project characters or graphs onto the input unit 13.

Figure 6:
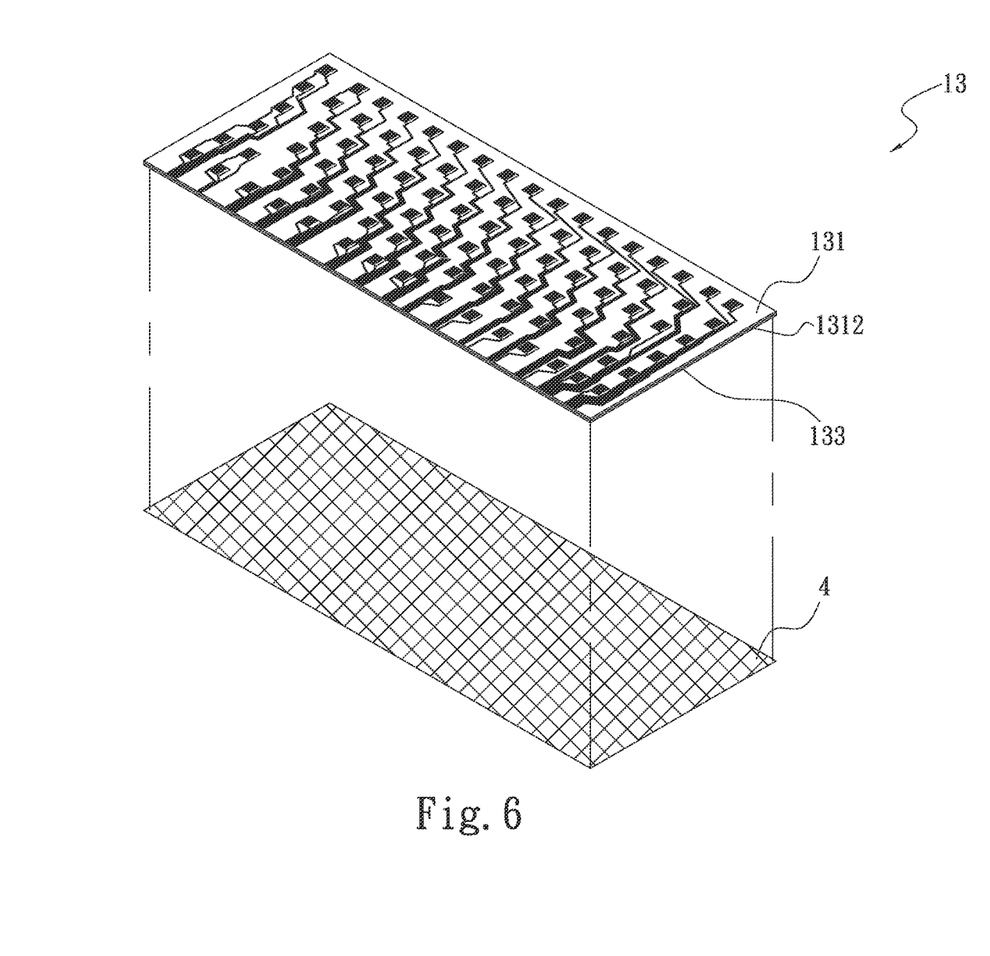
FIG. 6 is a perspective exploded view of the input unit of a fourth embodiment of the writing device with input unit of the present invention.

Please now refer to FIG. 6, which is a perspective exploded view of the input unit of a fourth embodiment of the writing device with input device of the present invention. The fourth embodiment is partially identical to the first embodiment in structure and thus will not be repeatedly described hereinafter. The fourth embodiment is different from the first embodiment in that an anti-inference layer 4 is disposed on the other face of the protection layer 133, which face is distal from the second face 1312 of the flexible main body 131. The anti-interference layer 4 is an anti-EMI layer for preventing the input unit 13 from interference and noise affection during signal transmission.

Figure 7:
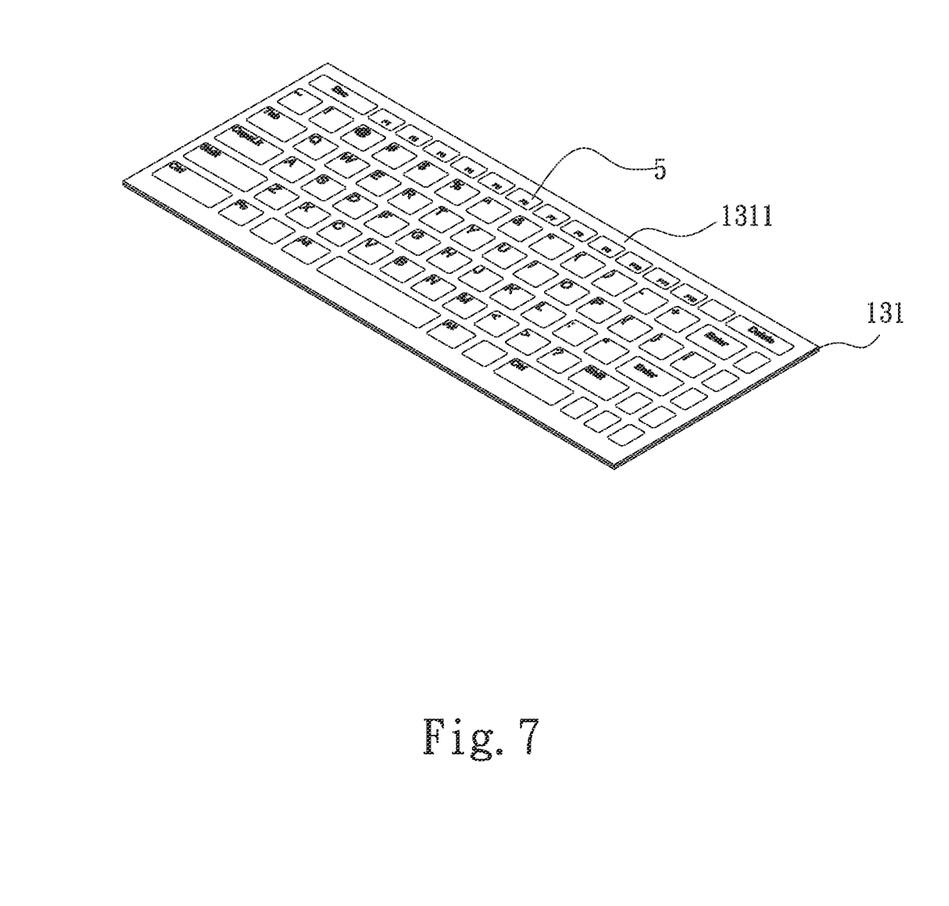
FIG. 7 is a perspective view of the input unit of a fifth embodiment of the writing device with input unit of the present invention.

Please now refer to FIG. 7, which is a perspective view of the input unit of a fifth embodiment of the writing device with input unit of the present invention. The fifth embodiment is partially identical to the first embodiment in structure and thus will not be repeatedly described hereinafter. The fifth embodiment is different from the first embodiment in that the fifth embodiment further includes a graphic layer 5 formed on the first face 1311 of the flexible main body 131 or one face of the protection layer 133 by means of printing, engraving or stamping. In this embodiment, the graphic layer 5 is disposed on, but not limited to, the first face 1311 of the flexible main body 131 for illustration purposes only. The graphic layer 5 can create virtual keys or graphs or characters on the first face 1311.

Figure 8:
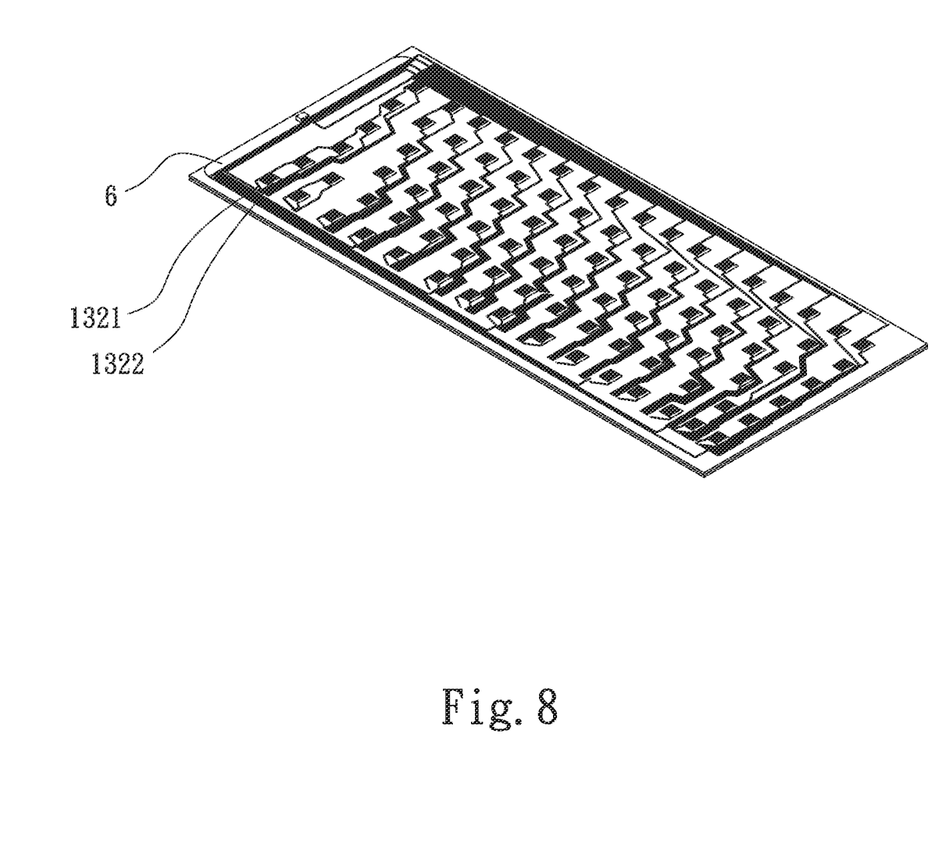
FIG. 8 is a perspective view of the input unit of a sixth embodiment of the writing device with input unit of the present invention.
Figure 9:
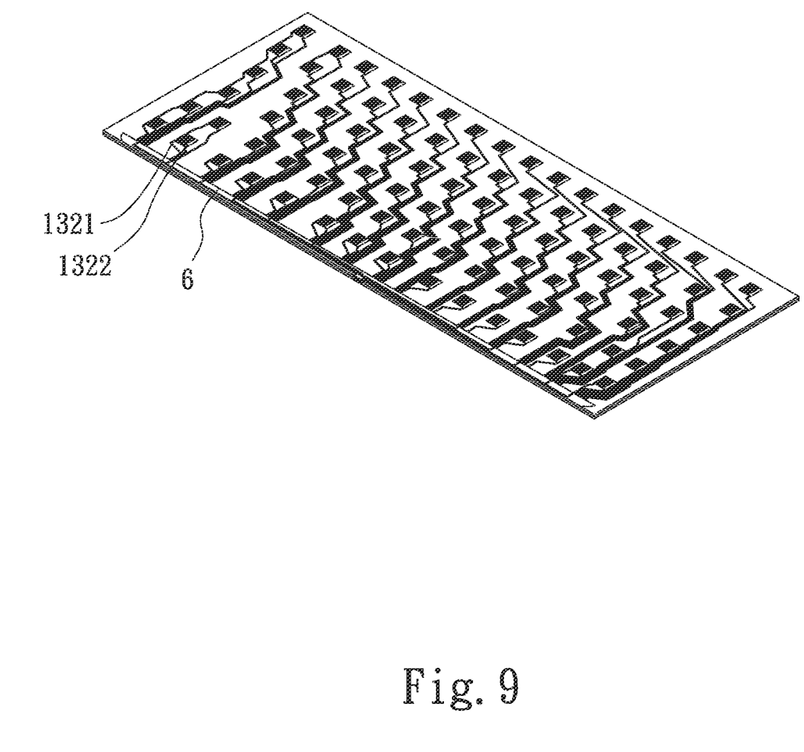
FIG. 9 is another perspective view of the input unit of the sixth embodiment of the writing device with input unit of the present invention.

Please now refer to FIGS. 8 and 9. FIG. 8 is a perspective view of the input unit of a sixth embodiment of the writing device with input unit of the present invention. FIG. 9 is another perspective view of the input unit of the sixth embodiment of the writing device with input unit of the present invention. The sixth embodiment is partially identical to the first embodiment in structure and thus will not be repeatedly described hereinafter. The sixth embodiment is different from the first embodiment in that the sixth embodiment further includes a flexible circuit board 6. The flexible circuit board 6 is disposed on a short side of the flexible main body 131 (as shown in FIG. 8) or a long side of the flexible main body 131 (as shown in FIG. 9). The flexible circuit board 6 is electrically connected to the first and second sensing electrodes 1321, 1322. By means of the flexible circuit board 6, the input unit 13 can be connected to other external electronic devices. Alternatively, by means of the flexible circuit board 6, the input unit 13 can be connected to an external power supply (such as a mobile power) to obtain power.

In the above embodiments, the flexible main body 131 of the input unit 13 is made of polymer material selected from a group consisting of polyethylene terephthalate (PET), polycarbonate (PC), polyethylene (PE), polyvinyl chloride (PVC), polypropylene (PP), polystyrene (PS), polymethylmethacrylate (PMMA) and cyclo olefin copolymer (COC). The flexible main body 131 is flexible, lightweight and thin for a user to conveniently carry.

Figure 10:
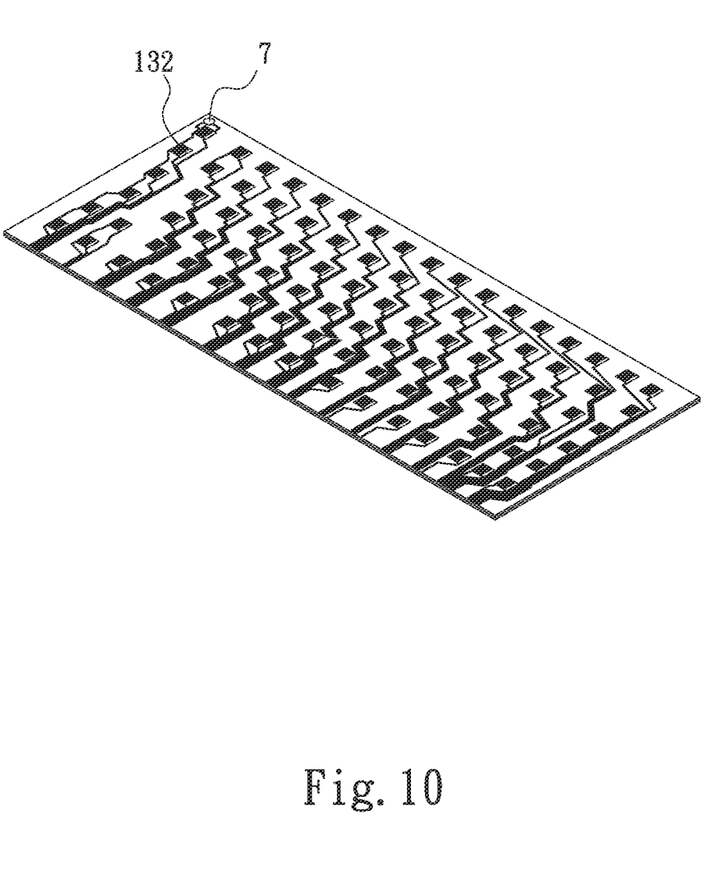
FIG. 10 is a perspective view of the input unit of a seventh embodiment of the writing device with input unit of the present invention.

In the above embodiments, the input unit 13 has both keyboard and handwriting tablet input functions. By means of a switch unit 7 (as shown in FIG. 10), a user can freely switch the portable input device 1 between a keyboard mode and a handwriting tablet mode. The switch unit 7 is a solid key or a slide switch. In FIG. 10, the switch unit 7 is, but not limited to, a solid key for illustration purposes only. The switch unit 7 is electrically connected to the sensing electrode layer 132.

Figure 11:
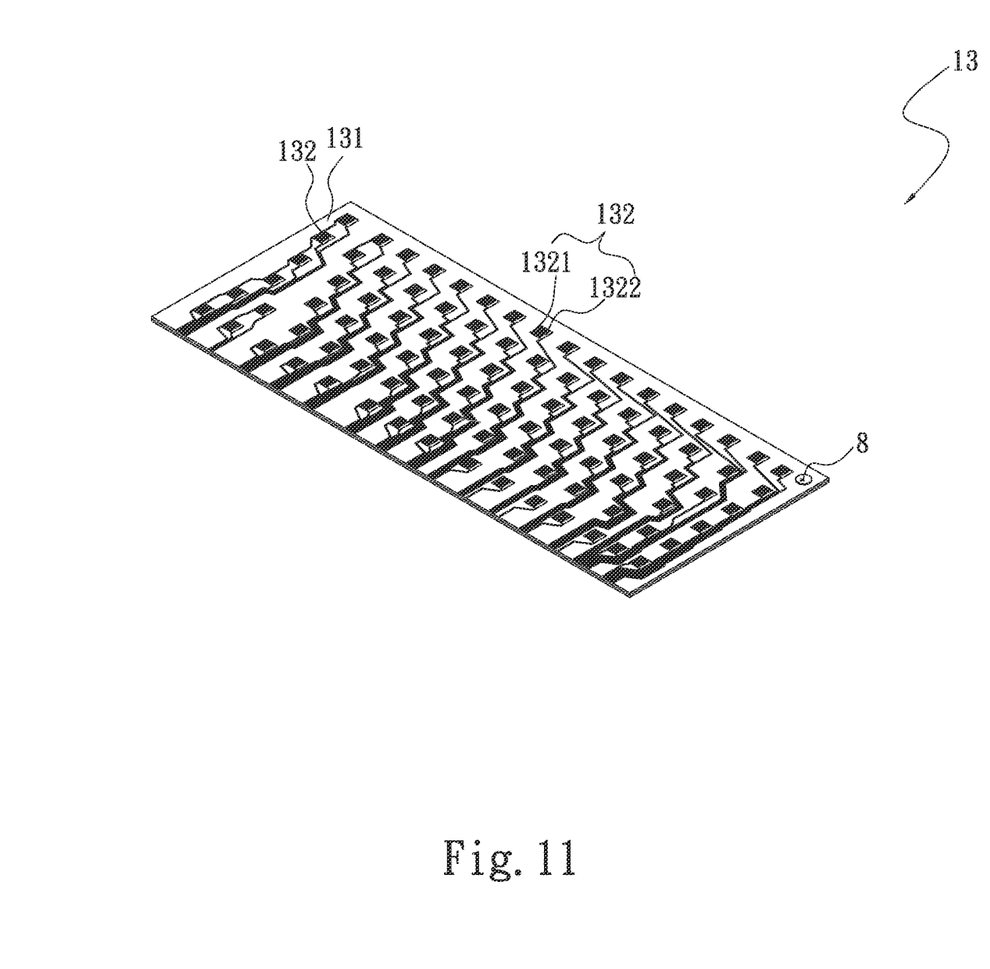
FIG. 11 is a perspective view of the input unit of an eighth embodiment of the writing device with input unit of the present invention.

Please now refer to FIG. 11, which is a perspective view of an eighth embodiment of the writing device with input unit of the present invention. The eighth embodiment is partially identical to the first embodiment in structure and thus will not be repeatedly described hereinafter. The eighth embodiment is different from the first embodiment in that a power supply 8 is disposed on the flexible main body 131 (or in the case 11) and electrically connected to the first and second sensing electrodes 1321, 1322. The power supply 8 is selected from a group consisting of rechargeable battery, replaceable cell, solar battery and bio-energy battery for supplying power for wireless input use.

Figure 12:
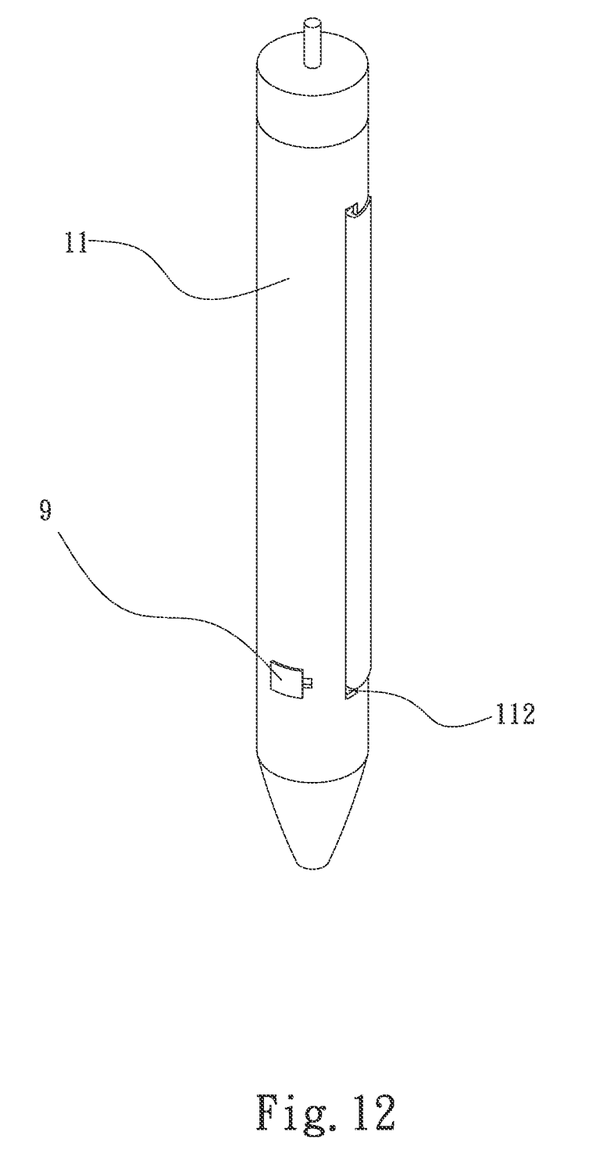
FIG. 12 is a perspective view of a ninth embodiment of the writing device with input unit of the present invention.
Figure 13:
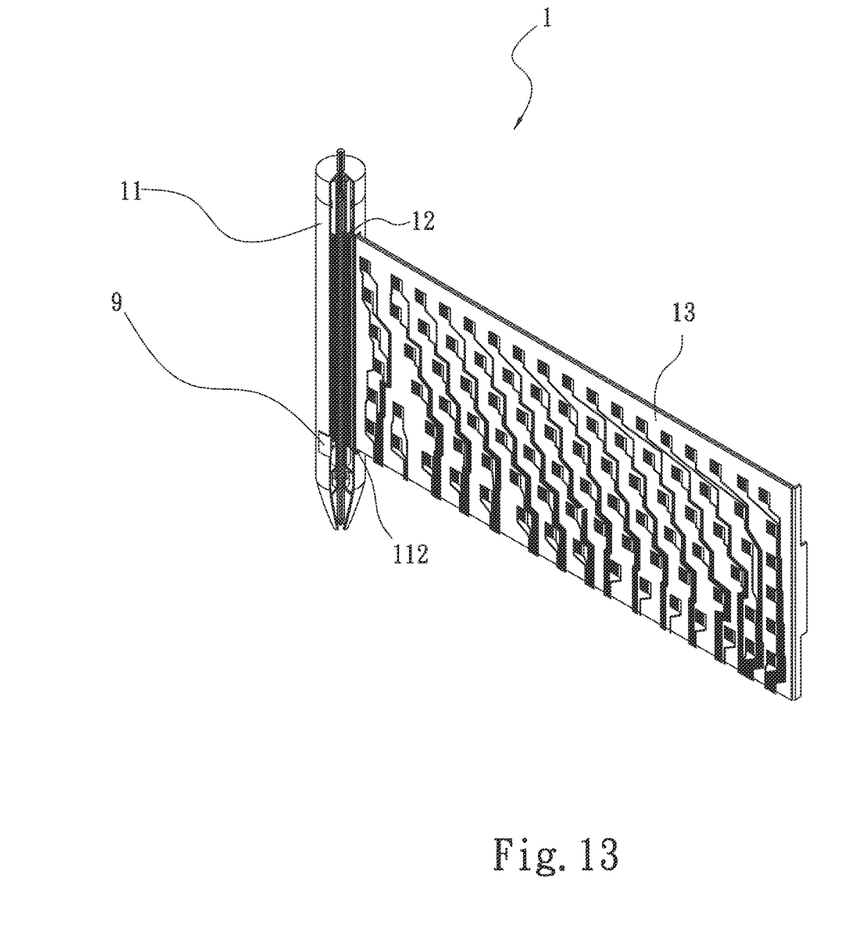
FIG. 13 is another perspective view of the ninth embodiment of the writing device with input unit of the present invention.

Please now refer to FIGS. 12 and 13. FIG. 12 is a perspective view of a ninth embodiment of the writing device with input unit of the present invention. FIG. 13 is another perspective view of the ninth embodiment of the writing device with input unit of the present invention. The ninth embodiment is partially identical to the first embodiment in structure and thus will not be repeatedly described hereinafter. The ninth embodiment is different from the first embodiment in that the ninth embodiment further includes a restriction member 9 disposed on the case 11 in adjacency to the opening 112. When the input unit 13 protrudes to the outer side of the case 11, the restriction member 9 serves to engage with (or press) the end of the input unit 13, which end is connected with the winding unit 12, so as to fix the input unit 13 and prevent the input unit 13 from being rewound onto the winding unit 12 and retracted into the case 11. Moreover, by means of the restriction member 9, when a user operates the input unit 13, the input unit 13 can keep fixed on the outer side of the case 11 in a plane state (as shown in FIG. 13).

Figure 14:
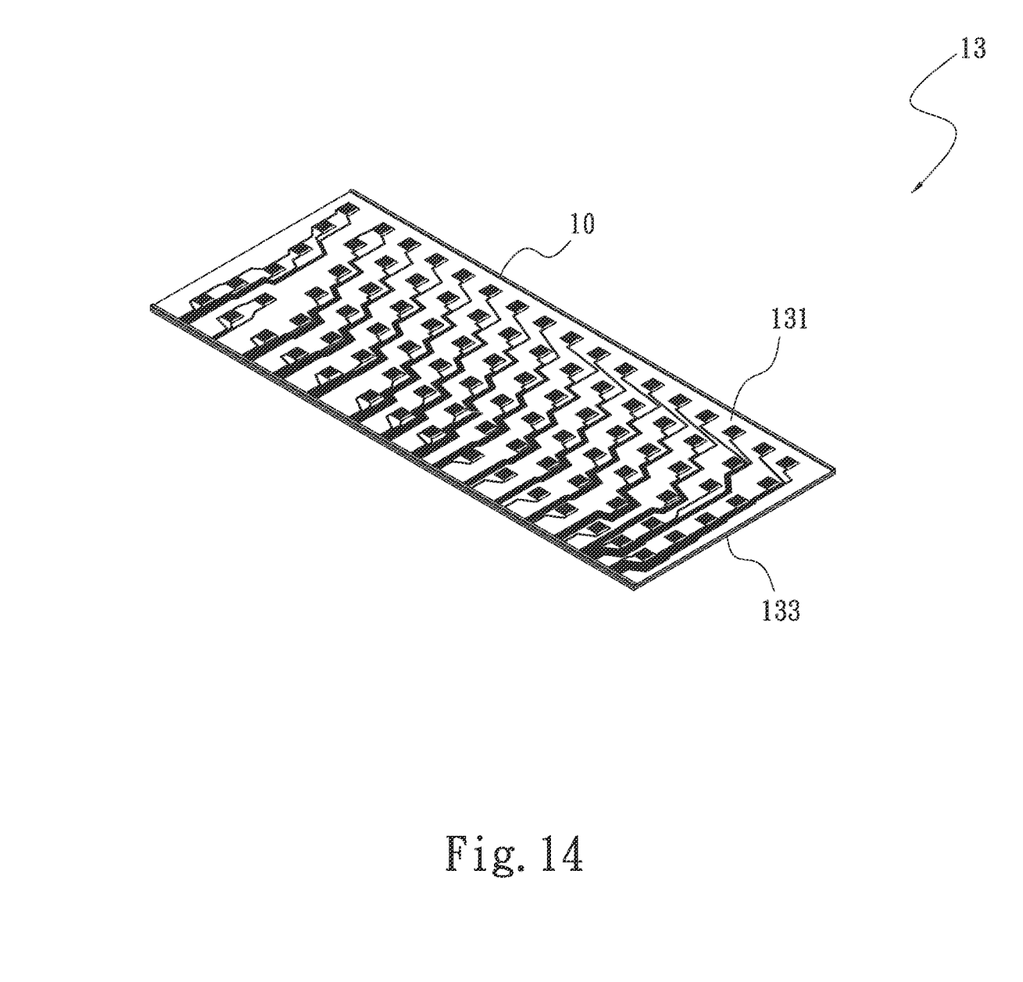
FIG. 14 is a perspective view of the input unit of a tenth embodiment of the writing device with input unit of the present invention.

Please now refer to FIG. 14, which is a perspective view of a tenth embodiment of the writing device with input unit of the present invention. The tenth embodiment is partially identical to the first embodiment in structure and thus will not be repeatedly described hereinafter. The tenth embodiment is different from the first embodiment in that the tenth embodiment further includes a memory metal layer 10. The memory metal layer 10 is disposed on the flexible main body 131 of the input unit 13 or the protection layer 133 thereof. In this embodiment, the memory metal layer 10 is disposed on, but not limited to, the flexible main body 131 for illustration purposes only. After the input unit 13 of the present invention is powered on, the memory metal layer 10 will absorb the heat of a user or the heat generated by the input unit 13. Accordingly, when the input unit 13 is drawn out of the case 11 (as shown in FIG. 4), the memory metal layer 10 serves to keep the input unit 13 in a plane state to facilitate operation.

The present invention has been described with the above embodiments thereof and it is understood that many changes and modifications in the above embodiments can be carried out without departing from the scope and the spirit of the invention that is intended to be limited only by the appended claims.

What is claimed is:

1. A writing device with input unit, comprising:
   a case having a receiving chamber and an opening;
   a winding unit disposed in the receiving chamber;
   a restriction member disposed on the case in adjacency to the opening; and
   an input unit, the input unit being wound on the winding unit with one end connected with the winding unit, the winding unit with the input unit wound thereon being received in the receiving chamber, the other end of the input unit protruding from the opening, the input unit including:
   a flexible main body having a first face and a second face;
   a sensing electrode layer having a first sensing electrode and a second sensing electrode, the first and second sensing electrodes being arranged in alignment with each other without contacting each other, the sensing electrode layer being disposed on the second face of the flexible main body; and
   a protection layer correspondingly disposed on the second face of the flexible main body to cover the sensing electrode layer;
   a flexible circuit board disposed on a short side of the flexible main body or a long side of the flexible main body and being electrically connected to the first and second sensing electrodes;
   a switch unit being electrically connected to the sensing electrode layer, the switch unit being a solid key for a user to freely switch the input unit between a keyboard mode and a handwriting tablet mode;
   wherein the restriction member is served to fix the input unit in a position where the input unit protrudes from the opening to an outer side of the case a sufficient amount to be operated; and
   wherein by means of the flexible circuit board, the input unit can be connected to other external electronic devices, or by means of the flexible circuit board, the input unit can be connected to an external power supply to obtain power.

2. The writing device with input unit as claimed in claim 1, wherein a writing head is disposed at one end of the case, the writing head being selected from a group consisting of a ballpoint pen head, a pencil head and a touch probe.

3. The writing device with input unit as claimed in claim 1, wherein the flexible main body is defined with a touch section and a non-touch section arranged around the touch section, the first and second sensing electrodes of the sensing electrode layer being disposed in the touch section, the first and second sensing electrodes partially extending to the non-touch section.

4. The writing device with input unit as claimed in claim 1, further comprising a wireless signal transmission unit electrically connected to the first and second sensing electrodes, the wireless signal transmission unit being selected from a group consisting of an infrared transmitter, a Bluetooth transmitter, an RF signal transmitter and an NFC (Near Field Communication) transmission chip.

5. The writing device with input unit as claimed in claim 1, further comprising a light-emitting unit having multiple LED bulbs.

6. The writing device with input unit as claimed in claim 1, wherein an anti-inference layer is disposed on the other face of the protection layer, which face is distal from the second face of the flexible main body.

7. The writing device with input unit as claimed in claim 1, further comprising a graphic layer formed on the first face of the flexible main body by means of printing, engraving or stamping.

8. The writing device with input unit as claimed in claim 1, further comprising a power supply disposed on the flexible main body and electrically connected to the first and second sensing electrodes.

9. The writing device with input unit as claimed in claim 1, further comprising a memory metal layer disposed on the flexible main body of the input unit or the protection layer thereof.

* * * * *